(12) United States Patent
Michishita et al.

(10) Patent No.: US 6,271,960 B1
(45) Date of Patent: Aug. 7, 2001

(54) METHOD AND APPARATUS FOR WAVELENGTH CONVERSION OF SIGNAL LIGHT

(75) Inventors: Yukio Michishita; Satoshi Ishii, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,580

(22) Filed: Feb. 26, 1999

(30) Foreign Application Priority Data

Mar. 13, 1998 (JP) .................................................. 10-063102

(51) Int. Cl.⁷ ...................................................... G02F 1/35
(52) U.S. Cl. ................................................................ 359/326
(58) Field of Search .................... 359/326–332; 372/43–45

(56) References Cited

U.S. PATENT DOCUMENTS

| | | | |
|---|---|---|---|
| 5,155,737 | * 10/1992 | Ikeda et al. | 372/43 |
| 5,237,577 | * 8/1993 | Keller et al. | 359/326 X |
| 5,892,614 | * 4/1999 | Asaba | 359/330 |

FOREIGN PATENT DOCUMENTS

| | | | |
|---|---|---|---|
| 195 35 772 A1 | 3/1997 | (DE) . | |
| 1-26096 | 5/1989 | (JP) . | |
| 2-235033 | * 9/1990 | (JP) | 359/108 |
| 3-101584 | 4/1991 | (JP) . | |
| 4-136826 | 5/1992 | (JP) . | |
| 6-302903 | 10/1994 | (JP) . | |
| 8-82814 | 3/1996 | (JP) . | |
| 8-97771 | 4/1996 | (JP) . | |
| 9-102643 | 4/1997 | (JP) . | |
| 10-197835 | 7/1998 | (JP) . | |

OTHER PUBLICATIONS

Y. Hashimoto, et al., "Optical Noise Reduction by a Semiconductor Waveguide Saturable Absorber", *Technical Digest of CPT 98*, dated Jan. 12–14, 1998, pp. 215–216.

Proceedings of the SPIE –*The International Society for Optical Engineering*, vol. 1378, pp. 116–126 (1991) P.E. Barnsley et al.

* cited by examiner

Primary Examiner—John D. Lee
(74) Attorney, Agent, or Firm—Scully, Scott, Murphy & Presser (57) ABSTRACT

A signal conversion device comprises a light source for emitting continuous wave (CW) light at a predetermined wavelength λ, an optical element having a saturable absorption function, and a wavelength demultiplexing circuit for separating signal light at a desired wavelength from signal light outputted from the optical element. A threshold value for optical transmission and absorption of the optical element having the saturable absorption area is set to a level such that applied signal light at a wavelength λs and the CW light outputted from the light source are absorbed at a light intensity level of either of the two lights, and are transmitted at a light intensity level of a total of the two lights.

13 Claims, 9 Drawing Sheets

METHOD AND APPARATUS FOR WAVELENGTH CONVERSION OF SIGNAL LIGHT

BACKGROUND OF THE INVENTION

1. Field of the Invention

In recent years, optical application technologies such as optical communication, optical information processing, and optical measurement have been rapidly developed, and a great need exists for the development of wavelength conversion technologies for an optical signal.

The present invention relates to a method and apparatus for wavelength conversion of signal light for converting a wavelength $\lambda s$ of signal light to an arbitrary wavelength of $\lambda 1$ to $\lambda n$, and an optical transmission scheme using the apparatus.

2. Description of the Related Art

Figure 1:
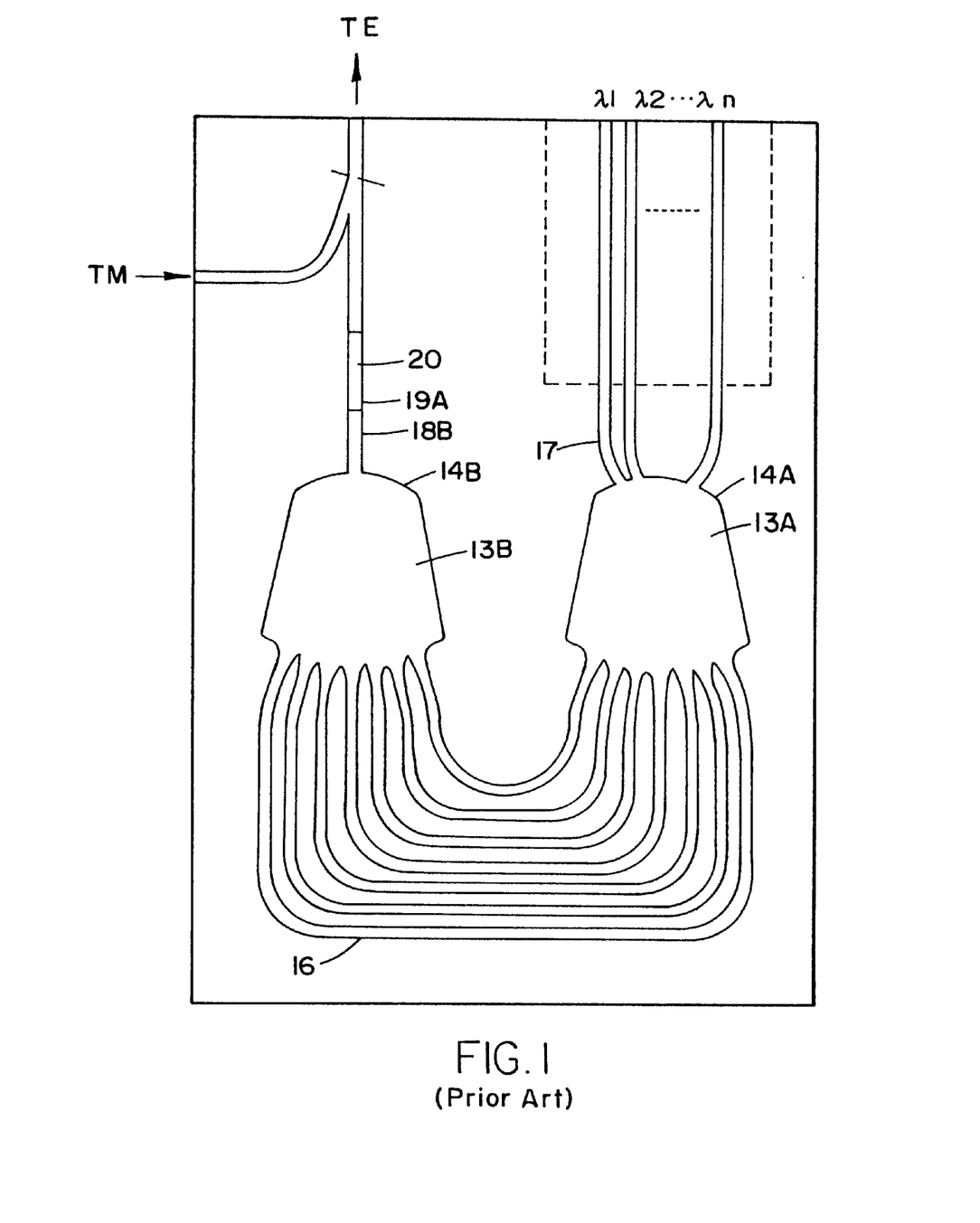
FIG. 1 is a diagram showing an example of a conventional optical signal conversion device.

Technologies as mentioned above for converting the wavelength of an optical signal include, for example, a semiconductor optical device disclosed in Laid-open Japanese Patent Application No. 6-302903 (JP-302903/1994). The configuration of this semiconductor optical device is shown in FIG. 1. Referring to FIG. 1, the semiconductor optical device is provided with slab optical waveguides 13A, 13B of fan shape at both ends of array waveguide 16 which comprises a plurality of waveguides having delay time difference. One slab optical waveguide 13A has focal surface 14A connected to a plurality of gain waveguides 17. The other slab optical waveguide 13B has focal surface 14B connected to saturable absorption waveguide 20 having a saturable absorption area through passive waveguide 19A and input/output gain waveguide 18B.

The device operates in the following manner. First, gain waveguide 17 supporting a required output optical signal wavelength is injected with a current a little less than a threshold value current at which laser oscillation is started. At this point, since spontaneous emission light emitted from gain waveguide 17 is absorbed in the saturable absorption area, the laser oscillation is suppressed. In this state, when an input optical signal is incident on input/output waveguide 18B, the light absorption is saturated in the saturable absorption area to generate the laser oscillation at a wavelength corresponding to the selected and conducted gain waveguide. This laser oscillation repeats on and off following the input optical signal, thereby causing the semiconductor optical device to serve as a wavelength conversion element. The outputted wavelength is instantaneously switched by switching the conducting gain waveguide 17.

Figure 2A:
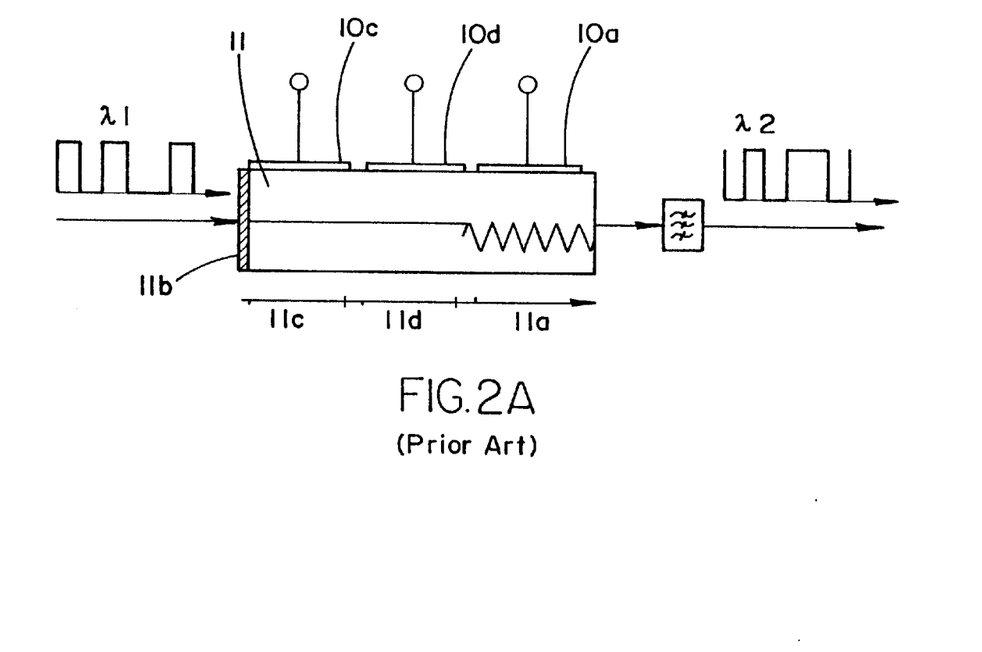
FIG. 2A and FIG. 2B are diagrams showing other examples of a conventional optical signal conversion device, respectively.
Figure 2B:
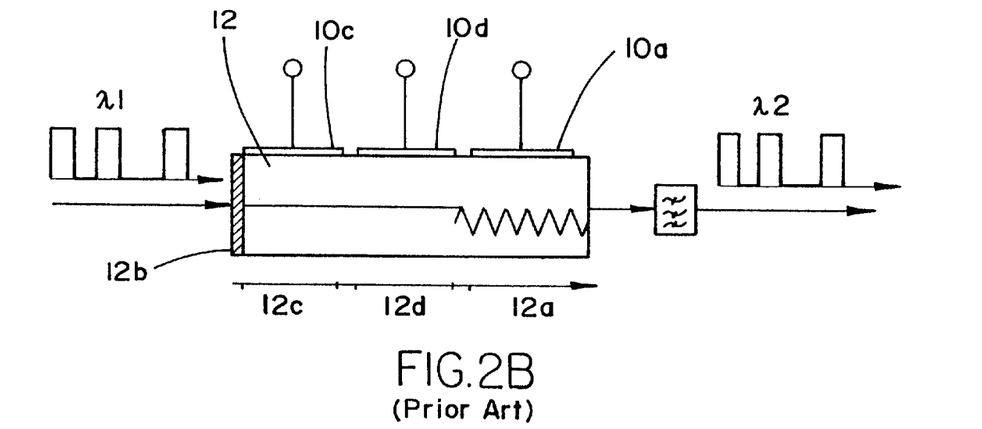

Also, in JP-102643/1997, an optical wavelength conversion circuit of oscillation suppression type as shown in FIG. 2A and an optical wavelength conversion circuit of saturable absorption type as shown in FIG. 2B are disclosed.

In the optical wavelength conversion circuit of oscillation suppression type in FIG. 2A, semiconductor laser 11 in free oscillation at wavelength $\lambda 2$ by injecting a current at an oscillation threshold value or more is applied with intensity modulated signal light at wavelength $\lambda 1$. The oscillation of the semiconductor laser is suppressed when the applied signal light is on, thereby outputting wavelength converted signal light at wavelength $\lambda 2$ which forms a complementary signal train to the applied signal light at wavelength $\lambda 1$.

In FIG. 2A, the optical wavelength conversion circuit comprises DBR (Distributed Bragg Reflection) type semiconductor laser 11 in which optical amplifying portion 11c having no polarization dependency as a gain area and oscillation polarization selecting portion 11d are disposed in a resonator which has DBR area 11a serving as an oscillation wavelength selecting portion and end surface 11b as two reflecting surfaces. In the respective areas, currents are injected from corresponding electrodes 10a, 10b, and 10c respectively.

In the optical wavelength conversion circuit of saturable absorption type in FIG. 2B, semiconductor laser 12, having a saturable absorption portion injected with a current at an oscillation threshold value or less and an optical amplifying portion injected with a current to the extent that it oscillates at a wavelength $\lambda 2$ when the absorption of the saturable absorption unit is reduced, is applied with intensity modulated signal light at a wavelength $\lambda 1$. The absorption of the saturable absorption portion is reduced to cause oscillation at wavelength $\lambda 2$ when the applied signal light is on, thereby outputting wavelength converted signal light at wavelength $\lambda 2$ which makes a signal train with the same sign as the applied signal light at wavelength $\lambda 1$.

Semiconductor laser 12 is a DBR type semiconductor laser in which saturable absorption portion 12c having no polarization dependency and optical amplifying portion 12d of polarization dependent type are disposed as a gain area in a resonator which has DBR area 12a and end surface 12b as two reflecting surfaces. Saturable absorption portion 12c and optical amplifying portion 12d have a property that the polarization dependency is low when a low current is injected and the polarization dependency is high when a high current is injected. Saturable absorption portion 12c serves as a saturable absorption area with no polarization dependency in a low current injected state. Optical amplifying portion 12d functions as a gain area, in which laser oscillation is started in a single mode by the mode gain difference dependent on the polarization when the absorption of saturable absorption portion 12c is reduced by the applied signal light being on in a high current injected state.

The operation of this circuit is as follows. The intensity modulated signal light at the wavelength $\lambda 1$ is applied to saturable absorption portion 12c with no polarization dependency. In saturable absorption unit 12c, carrier density is increased by stimulated absorption of the applied signal light, regardless of the polarization. With this, the loss in the laser resonator at the wavelength $\lambda 2$ is reduced, resulting in the oscillation at the wavelength $\lambda 2$ only when the applied signal light is on. In other words, the outputted level of the oscillation light at the wavelength $\lambda 2$ is modulated in the same sign in accordance with the on and off of the applied signal light at the wavelength $\lambda 1$, and the wavelength conversion is performed from the wavelength $\lambda 1$ to the wavelength $\lambda 1$.

An optical device having a saturable absorption area, hereinafter referred to as an SA (Saturable Absorber), has a saturable absorption effect caused by applying a semiconductor waveguide with a reverse bias, and is also referred to as an optical gate. Specifically, the SA has a nonlinear transmission characteristic dependent on the intensity of applied light, in which incident signal light with a low intensity is greatly absorbed and reduced, whereas incident signal light with a higher intensity causes a reduction in the absorption coefficient and exceeds the absorption capacity of the optical device to be transmitted. For realization of such SA, for example, Hashimoto et al. reported the realization thereof by applying a semiconductor laser amplifier with a reverse bias. (Y. Hashimoto et al. Technical Digest of CPT98, pp 215–216, Jan. 12–14, 1998).

SUMMARY OF THE INVENTION

The above-mentioned conventional signal conversion device has a disadvantage that an output level of converted signal light is low and unstable. In view of this disadvantage, it is an object of the present invention to provide a signal conversion device capable of converting a wavelength of signal light, specifically pulse-type signal light to an arbitrary wavelength and outputting stably the converted signal light.

In order to achieve the above-mentioned object, the signal conversion device of the present invention comprises:

a light source for emitting continuous wave (CW) light at a predetermined wavelength;

an optical element applied with signal light at a wavelength $\lambda$ and the CW light outputted from the light source and having a threshold value for a saturable absorption area such that the optical element absorbs the light at a light intensity level of either of the light and transmits the light at a light intensity level of a total of the light; and a wavelength demultiplexing circuit for separating signal light at a desired wavelength from the signal light outputted from the optical element.

As mentioned above, the signal conversion device comprises the light source for emitting the predetermined CW light, the SA having the predetermined threshold value for optical transmission and absorption, and the wavelength demultiplexing circuit for demultiplexing the signal light outputted from the SA to the signal light at a desired wavelength. Thus, when this device is applied with the signal light at the wavelength $\lambda s$ and the CW light at wavelengths $\lambda 1$ to $\lambda n$ emitted from the light source, the light is absorbed at an intensity of either of the lights, while all the signal with both wavelengths passes through the SA only when the signal light and the CW light are simultaneously applied and a total of light intensities exceeds the threshold value of the SA. Therefore, an arbitrary wavelength within the wavelengths $\lambda 1$ to $\lambda n$ is selected and extracted by the wavelength demultiplexing circuit, thereby converting the wavelength $\lambda s$ of the signal light to the arbitrary wavelength.

Additionally, an optical amplifier can be used to output stably the signal light at a converted wavelength.

The above and other objects, features, and advantages of the present invention will be apparent from the following description referring to the accompanying drawings which illustrate an example of preferred embodiments of the present invention.

DETAILED DESCRIPTION OF THE PREFERRED EMBODIMENTS

Next, preferred embodiments of the present invention will be described with reference to the drawings.

Figure 3:
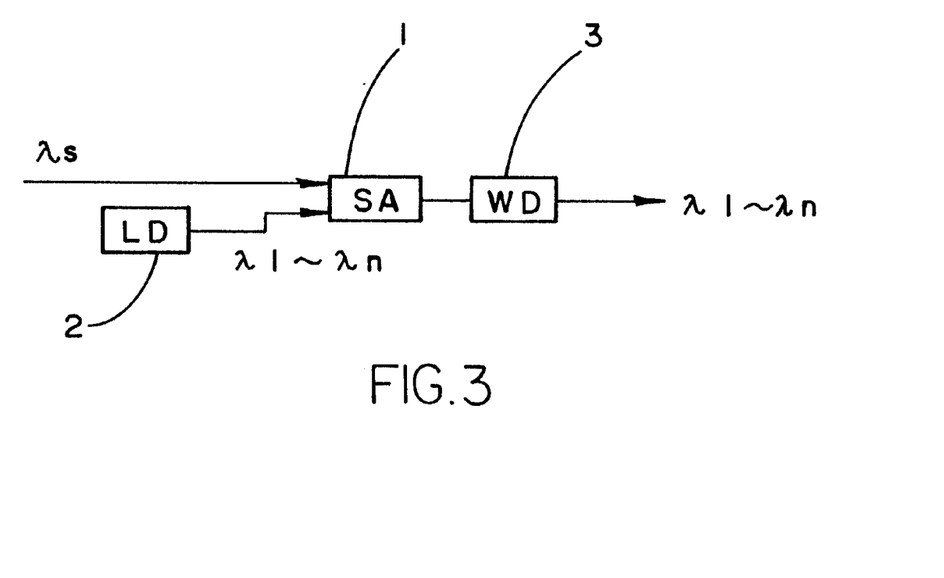
FIG. 3 is a block diagram showing a basic configuration of a signal conversion device of the present invention.

Referring to FIG. 3, a signal conversion device of the present invention comprises a light source 2 such as a laser diode (LD) for emitting continuous wave (CW) light at a predetermined wavelength of $\lambda 1$ to $\lambda n$; SA1 having a predetermined value level for light transmission and absorption, and applied with signal light at a wavelength $\lambda s$ and the CW light at the wavelength of $\lambda 1$ to $\lambda n$ emitted from light source 2; and wavelength demultiplexing circuit 3 for demultiplexing the signal light outputted from SA1 to signal light at a desired wavelength.

Figure 4:
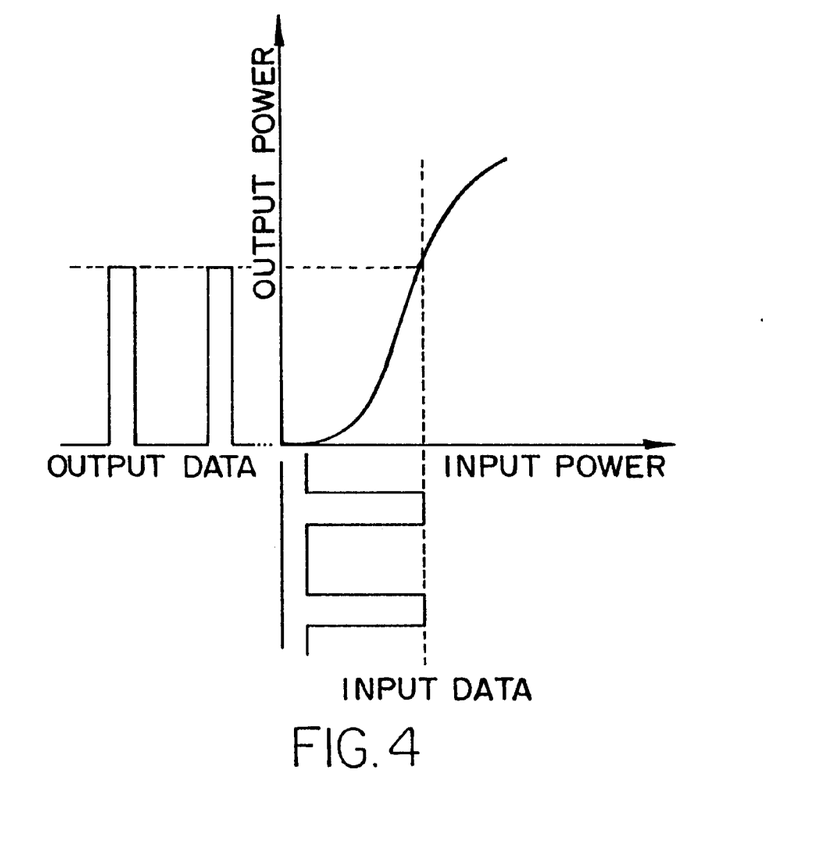
FIG. 4 is an explanatory diagram for a saturable absorption type optical device (SA: Saturable Absorber)

SA1, as shown in FIG. 4, has a nonlinear transmission characteristic dependent on the intensity of applied light, in which light with a high light intensity above the absorption capacity of SA1 is transmitted whereas light with a low light intensity is subjected to absorption, greatly reduced and prevented from being transmitted.

Thus, the mutual relationship between the intensity level of the applied signal light, the intensity level of the CW light emitted from light source 2, and the threshold value for the transmission and absorption coefficient of SA1 is set such that a synthesized light intensity of the signal light pulse and the CW light exceeds the absorption capacity of SA1 to output transmission light when signal data is at a high (Hi) level, whereas the applied light is absorbed and not transmitted even with the presence of the CW light when the signal data is at a low (Lo) level. In other words, the threshold value level for the light transmission and absorption of SA1 is a level at which all incident light is transmitted when the signal data is present and at Hi level, whereas all the incident light is absorbed when the signal data is absent and at Lo level. In the most simplest case where the signal data is of pulse-type, peaks of the pulse are set to Hi level, the remaining non-peak portions of the pulse are set to Lo level, and only the incident light at the peaks of the pulse train is passed to perform the wavelength conversion.

Therefore, if the light intensity of the signal light at the wavelength $\lambda s$ and the light intensity of the CW light at any of n wavelengths $\lambda 1$ to $\lambda n$ are set in correspondence with the above-mentioned threshold value level of SA1, the applied signal light at the wavelength λs and the signal light at the wavelength of λ1 to λn synchronized with the signal light at the wavelength λs are outputted only when the pulse signal is present, i.e. when the signal light is at Hi level, whereas no incident light is outputted when the pulse signal is absent, i.e. at Lo level. As a result, pulse signal light at the wavelength of λ1 to λn is outputted in synchronization with the pulse input signal at the wavelength λs.

The signal light outputted from SA1 is separated by wavelength demultiplexing circuit 3, so that the input data signal at the wavelength λs, specifically an optical pulse signal, can be converted to a signal pulse at any of desired wavelengths within the λ1 to λn.

Figure 5A:
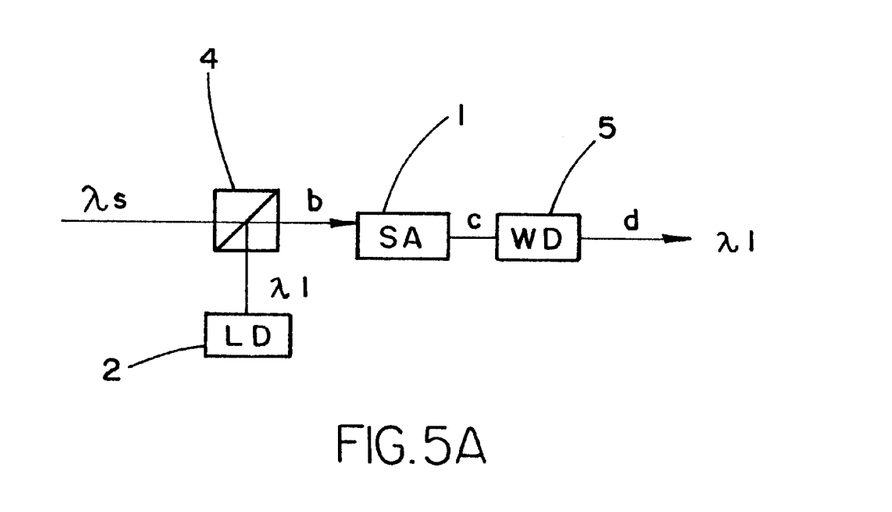
FIG. 5A is a block diagram showing a circuit configuration of a first embodiment of the present invention.

A signal conversion device of a first embodiment, as shown in FIG. 5A, comprises light source 2 for emitting CW light at one wavelength λ1, i.e. n=1; optical multiplexer 4 for multiplexing a signal light pulse at a wavelength λs and the CW light at the wavelength λ1 from light source 2; SA1 applied with the signal light and the CW light multiplexed in optical multiplexer 4; and optical demultiplexer WD5 of wavelength selecting type for separating the signal light at the wavelength λ1 from the output from SA1.

Figure 5B:
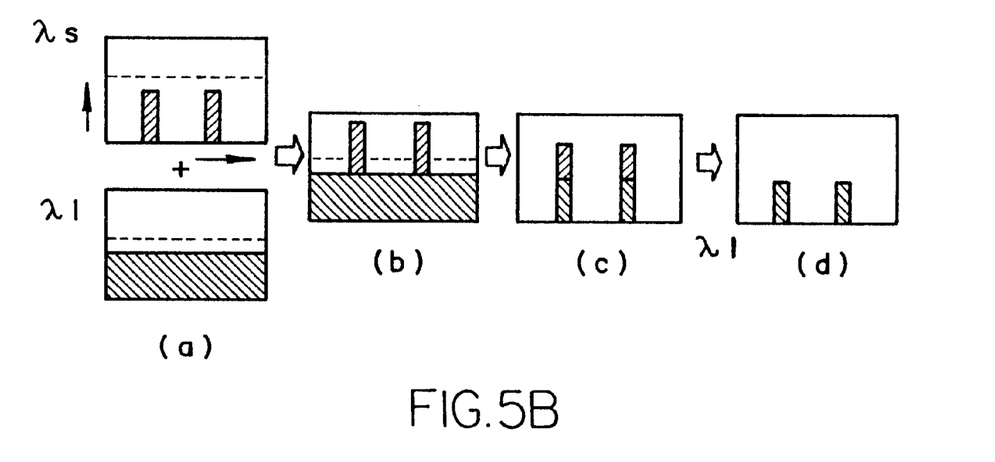
FIG. 5B is an explanatory diagram for a signal conversion process of the first embodiment of the present invention.

The operation thereof is shown in FIG. 5B. (a) First, the signal light pulse at the wavelength λs and the CW light at the wavelength λ1 from light source 2 are multiplexed in optical multiplexer 4 and applied to SA1, which state is shown in (b). A dotted line in (b) shows the level of a threshold value. SA1 transmits the multiplexed light of the applied signal light and the CW light as shown in (c) only when a total power of the applied light exceeds the threshold value, i.e. when the signal light pulse is present. Optical demultiplexer 5 separates the signal light pulse at the wavelength λ1 from the applied multiplexed light of the light at the wavelengths λs and λ1 and outputs the separated light as shown in (d). In other words, the signal light pulse at the wavelength λs applied to optical multiplexer 4 is converted for the wavelength from the λs to the λ1 and then outputted from optical demultiplexer 5.

Figure 6:
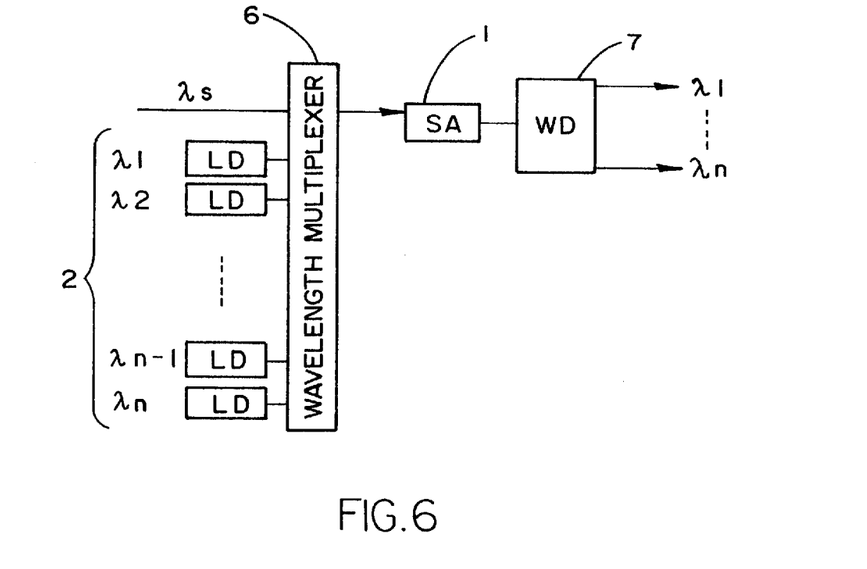
FIG. 6 is a block diagram showing a configuration of a second embodiment of the present invention.

A second embodiment, as shown in FIG. 6, further uses optical multiplexing circuit 6 for multiplexing CW light at n wavelengths of λ1 to λn and wavelength demultiplexing circuit 7 for demultiplexing the multiplexed light for the respective wavelengths of λ1 to λn, thereby converting applied signal light at a wavelength λs to signal light at n wavelengths.

Optical multiplexing circuit 6 and wavelength demultiplexing circuit 7 can be implemented using an Array Waveguide Grating (AWG) and the like.

Figure 7:
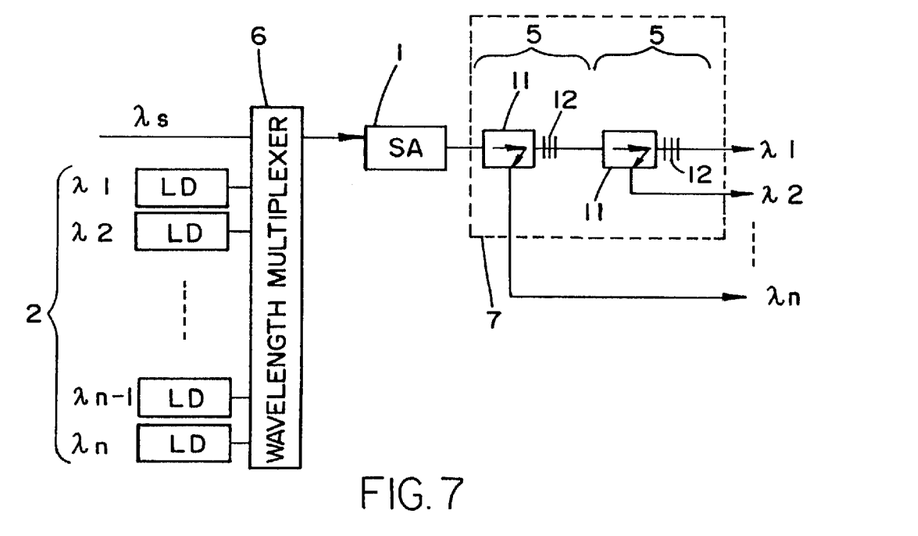
FIG. 7 shows a configuration example of wavelength demultiplexing circuit 7.

Wavelength demultiplexing circuit 7, for example as shown in FIG. 7, has optical demultiplexers 5 of wavelength selecting type in cascade shape, in which each optical demultiplexer 5 performs demultiplexing for one wavelength. Each optical demultiplexer 5 comprises directional coupler 11 for transmitting signal light only in one direction indicated by an associated arrow and wavelength selecting filter 12 for reflecting only the signal light at a specific wavelength and for transmitting the signal light at the remaining wavelength. Such directional coupler 11 and wavelength selecting filter 12 can be implemented using an optical circulator, fiber grating and so on.

Figure 8:
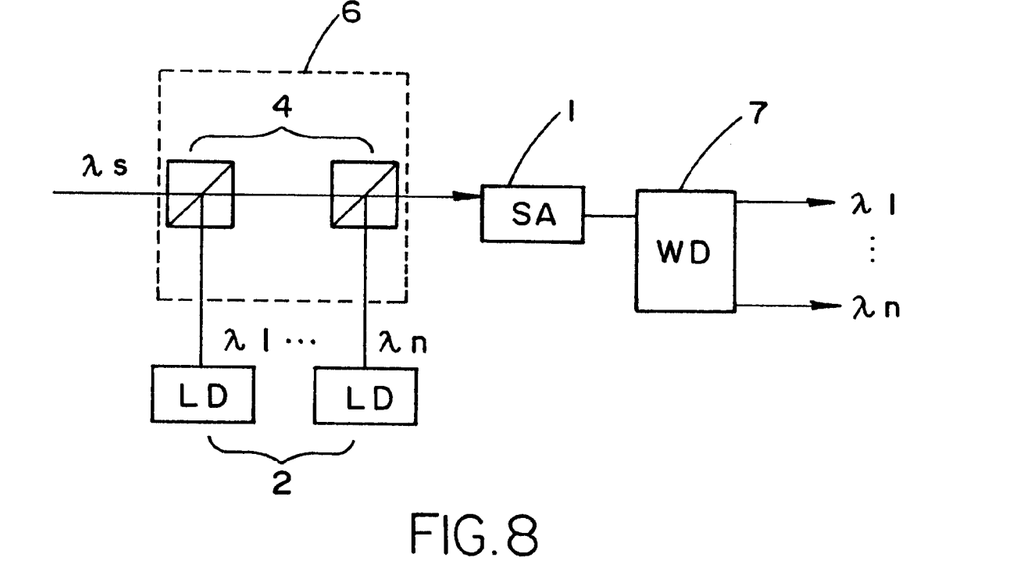
FIG. 8 shows a configuration example of optical multiplexing circuit 6.

Wavelength multiplexing circuit 6, as shown in FIG. 8, can comprise in cascade shape optical multiplexers 4 each for multiplexing one wavelength to multiplex a required number of wavelengths.

Figure 9:
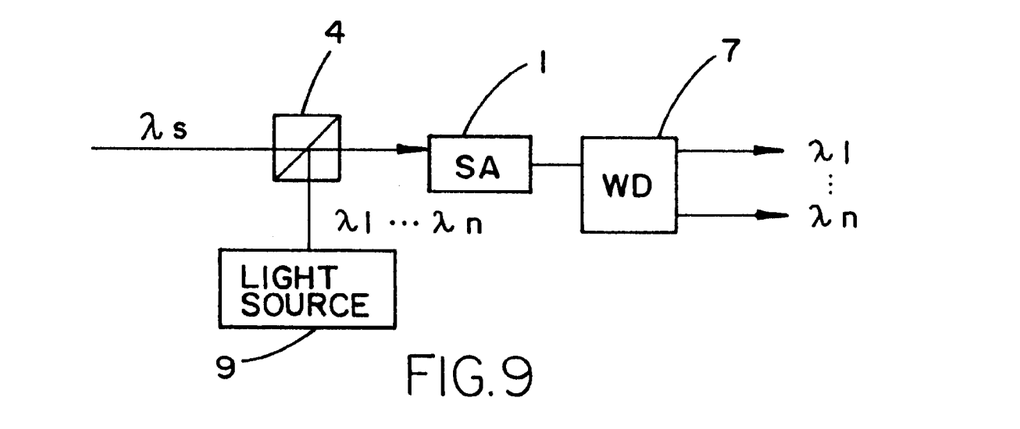
FIG. 9 is a block diagram showing a configuration in which light source 2 in the second embodiment of the present invention is replaced with multi-wavelength light source 9.

FIG. 9 shows an example of using, as a light source, multi-wavelength light source 9 which emits by itself CW light at a plurality of wavelengths.

Figure 10:
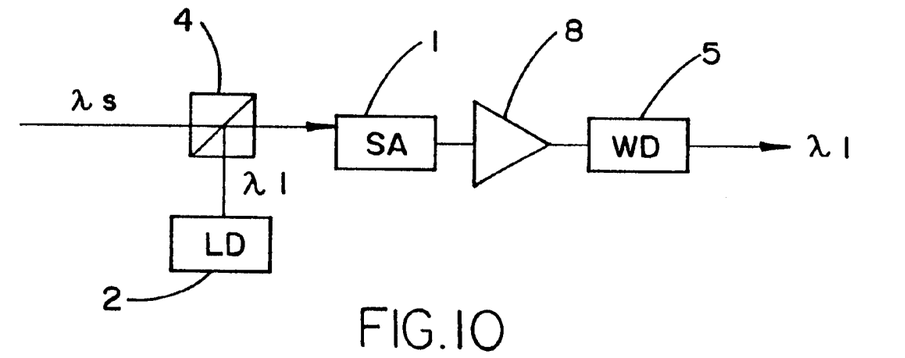
FIG. 10 is a block diagram showing configuration example 1 in which optical amplifier 8 is added to the first embodiment of the present invention.
Figure 11:
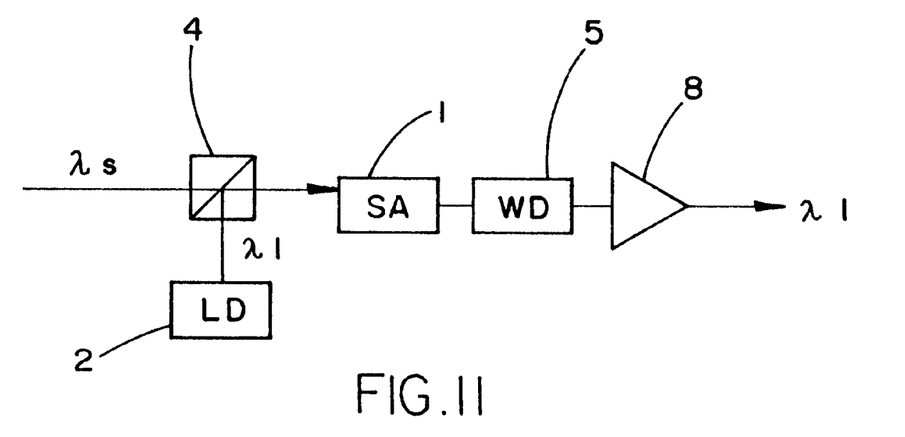
FIG. 11 is a block diagram showing configuration example 2 in which optical amplifier 8 is added to the first embodiment of the present invention.

In the first embodiment, when optical amplifier 8 for amplifying an optical signal is used for compensating the loss by wavelength selecting type demultiplexer 5, optical amplifier 8 may be connected to an output of SA1 as shown in FIG. 10, or may be connected to an output of demultiplexer 5 of wavelength selecting type as shown in FIG. 11.

Figure 12:
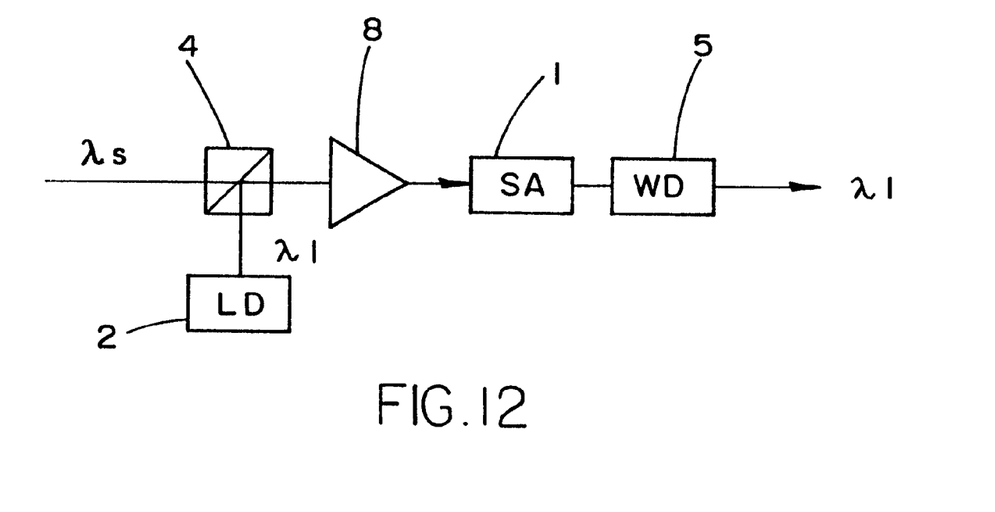
FIG. 12 is a block diagram showing configuration example 3 in which optical amplifier 8 is added to the first embodiment of the present invention.
Figure 13:
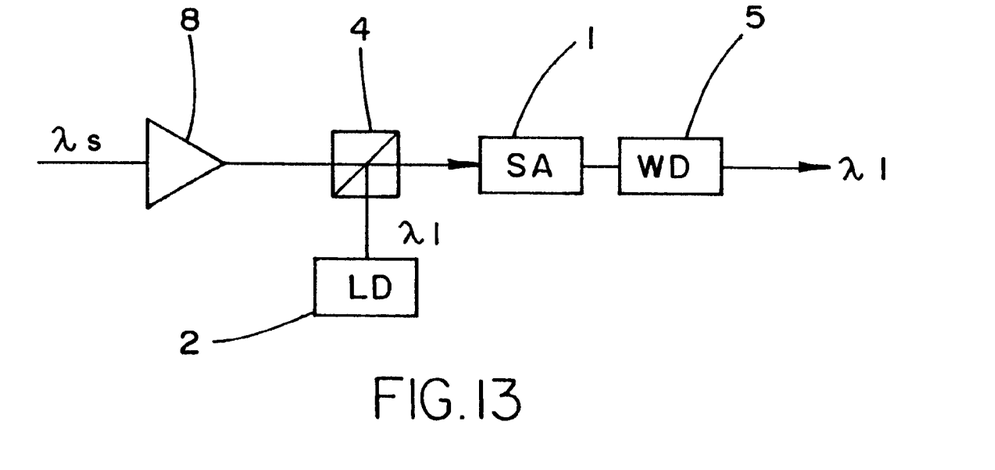
FIG. 13 is a block diagram showing configuration example 4 in which optical amplifier 8 is added to the first embodiment of the present invention.

Also, in order to supply SA1 with a stable input, as shown in FIG. 12 and FIG. 13, optical amplifier 8 for amplifying an optical signal can be connected to an input of SA1 or to an input of wavelength multiplexer 4.

Figure 14:
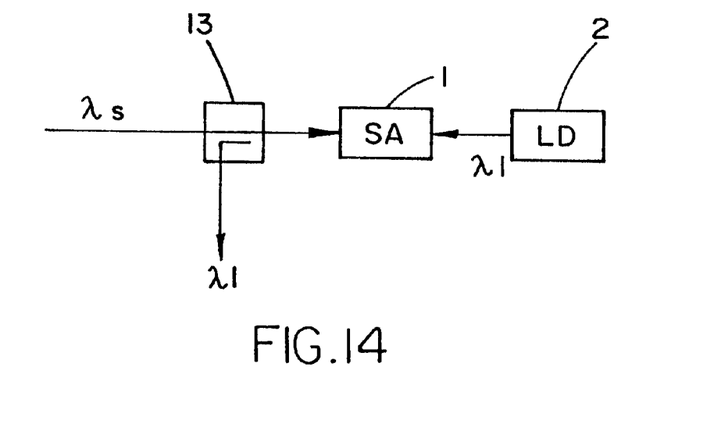
FIG. 14 is a circuit diagram showing a configuration example of a third embodiment of the present invention.

A signal conversion device shown in FIG. 14 has a configuration in which CW light at a wavelength λ1 emitted from light source 2 and signal light at a wavelength λs are applied to SA1 from opposite directions, respectively, and the signal light at the wavelength λ1 is demultiplexed and outputted from optical demultiplexer 13 connected to the input side of the signal light at the wavelength λs.

In the case of this embodiment, it is also possible that light source 2 is implemented with a light source which emits light at multiple wavelengths of λ1 to λn, wavelength demultiplexers 5, 7, 13 and so on are connected to an input portion of the signal light at the wavelength λs, and signal light at an arbitrary one or a plurality of wavelengths is outputted within the wavelengths λ1 to λn. Additionally, one wavelength λ1 within the wavelengths of the CW light emitted from light source 2 can be set at the same wavelength as wavelength λs of the input signal light.

Figure 15:
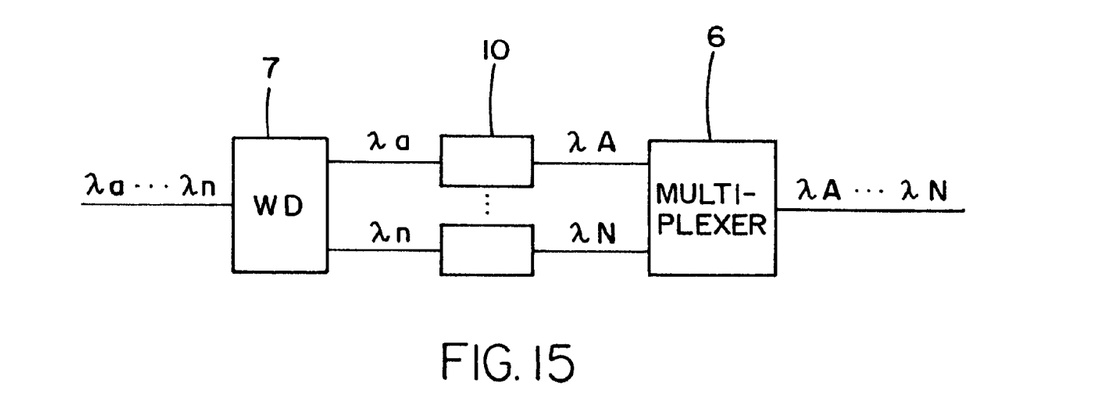
FIG. 15 is a block diagram showing one embodiment of an optical transmission scheme using the signal conversion device of the present invention.

Next, an optical transmission system of a wavelength division multiplexing scheme using the signal conversion device of the present invention will be described with reference to FIG. 15.

The optical transmission system of this embodiment comprise wavelength demultiplexing circuit WD7 for separating applied multiplexed signal light at wavelengths λa, λb, . . . , λn for each wavelength; the signal conversion devices 10 of the present invention connected to respective output terminals of wavelength demultiplexing circuit WD7 for converting the wavelengths of the respective applied signal light to determined wavelengths λA, λB, . . . , λN; and wavelength multiplexing circuit 6 for wavelength multiplexing the signal light outputted from signal conversion devices 10 to output the multiplexed signal light from one optical line. Wavelength demultiplexing circuit 7 and wavelength multiplexing circuit 6 can comprise an AWG, an optical demultiplexer, an optical filter, an optical multiplexer and so on, respectively.

The applied multiplexed signal light is demultiplexed by wavelength demultiplexing circuit 7 for each of the wavelengths λa, λb, . . . , λn and sent to respective signal conversion devices 10. Next, the signal light at the wavelengths λa, λb, . . . , λn applied to respective signal conversion devices 10 is converted to the respectively determined wavelengths λA, λB, . . . , λN and applied to wavelength multiplexing circuit 6. Wavelength multiplexing circuit 6 wavelength-multiplexes the signal light at the plurality of wavelengths λA, λB, . . . , λN outputted from respective signal conversion devices 10 to output one multiplexed signal light.

It is understood that variations and modifications of the signal conversion device disclosed herein will evident to those skilled in the art. It is intended that all such modifications and variations be included within the scope of the appended claims.

What is claimed is:

1. A wavelength conversion method for signal light, using a light source for emitting continuous wave (CW) light at a predetermined wavelength λ and an optical element in the fonn of a Saturable Absorber (SA) having a saturable absorption area, said optical element having a threshold value such that said optical element transmits light with a light power level above the threshold value and absorbs light with a light power level equal to or below the threshold value, to convert applied signal light at a wavelength λs to signal light at the predetermined wavelength λ, the method comprising the steps of:

setting light power levels of the applied signal light and the CW light outputted from said light source such that either of the two light power levels is equal to or below the threshold value of said SA and a total of the two light power levels exceeds the threshold value of said SA;

applying said SA with both the signal light at the wavelength λs and the CW light at the wavelength λ; and     separating the outputted light transmitted through said SA to output signal light at a desired wavelength synchronized with the applied signal light.

2. A optical signal conversion device comprising:

a light source for emitting continuous wave (CW) light at a predetermined wavelength λ;

an optical element in the form of a Saturable Absorber (SA) having a Saturable Absorption area such that said optical element transmits light with a light power level above a threshold value and absorbs light with a light power level equal to or below the threshold value, said SA being applied with the CW light and signal light at a wavelength λs;

a wavelength demultiplexing circuit for separating signal light at a desired wavelength from the outputted signal light transmitted through said SA; and     input light intensity controlling means for controlling a power level of the applied signal light and a power level of the CW light outputted from said light source such that either of the two light power levels is equal to or below the threshold value of said SA and a total of the two light power levels exceeds the threshold value of said SA.

3. The optical signal conversion device according to claim 2, further comprising a wavelength multiplexing circuit for multiplexing the applied signal light and the CW light emitted from said light source.

4. The optical signal conversion device according to claim 3, further comprising optical signal amplifying means on an input side of said wavelength multiplexing circuit.

5. The optical signal conversion device according to claim 2, wherein said light source includes a plurality of light sources for emitting the CW light at wavelengths λ1 to λn, respectively.

6. The optical signal conversion device according to claim 5, wherein the CW light at wavelengths λ1 o λn emitted from said light source and the applied signal light at the wavelength λs are applied to said SA having the Saturable Absorption area from opposite directions to each other, and the signal light at the wavelength λs is converted to signal light at the wavelengths λ1 to λn to be outputted from an input terminal of the signal light.

7. The optical signal conversion device according to claim 6, wherein any of the wavelengths λ1 to λn of the CW light emitted from said light source is equal to the wavelength λs of the signal light.

8. The optical signal conversion device according to claim 2, wherein said light source includes a single light source for emitting the CW light at a plurality of wavelengths λ1 to λn.

9. The optical signal conversion device according to claim 2, wherein said desired wavelength comprises a plurality of wavelengths and wherein said wavelength demultiplexing circuit separates said plurality of wavelengths from said outputted signal light transmitted through said SA.

10. The optical signal conversion device according to claim 2, further comprising optical signal amplifying means on an output side of said SA having the Saturable Absorption area.

11. The optical signal conversion device according to claim 2, further comprising optical signal amplifying means on an output side of said wavelength demultiplexing circuit.

12. The optical signal conversion device according to claim 2, further comprising optical signal amplifying means on an input side of said SA.

13. An optical transmission system of wavelength division multiplexing transmission scheme comprising:

a wavelength demultiplexing circuit for separating applied multiplexed signal light into signal light for respective wavelengths;

a signal conversion device including a light source for emitting continuous wave (CW) light at a predetermined wavelength λ, an optical element applied with signal light and the CW light outputted from said light source and having a threshold value for a saturable absorption area such that said optical element absorbs the light at a light power level of either of the lights and transmits the light at a light power level of a total of the light, and a wavelength demultiplexer for separating signal light at a desired wavelength from the outputted signal light transmitted through said optical element, the signal conversion device being connected to said wavelength demultiplexing circuit; and     a wavelength multiplexing circuit connected to an output terminal of said wavelength demultiplexer of said signal conversion device.

* * * * *

UNITED STATES PATENT AND TRADEMARK OFFICE
CERTIFICATE OF CORRECTION

PATENT NO. : 6,271,960 B1
DATED : August 7, 2001
INVENTOR(S) : Y. Michishita et al.

It is certified that error appears in the above-identified patent and that said Letters Patent is hereby corrected as shown below:

<u>Column 7,</u>
Line 2, "fonn" should read -- form --

Signed and Sealed this

Thirtieth Day of April, 2002

Attest:

JAMES E. ROGAN
Attesting Officer *Director of the United States Patent and Trademark Office*